Sept. 1, 1964   G. E. MILLER   3,147,005
CLAMPING ASSEMBLY
Filed July 20, 1962
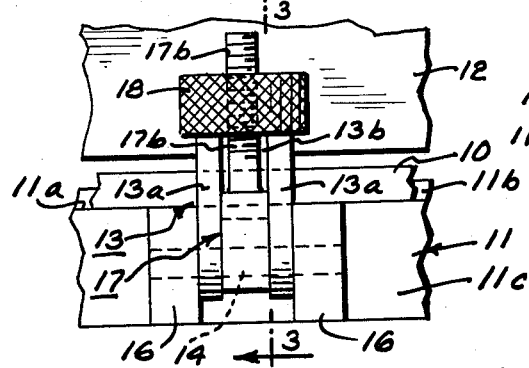
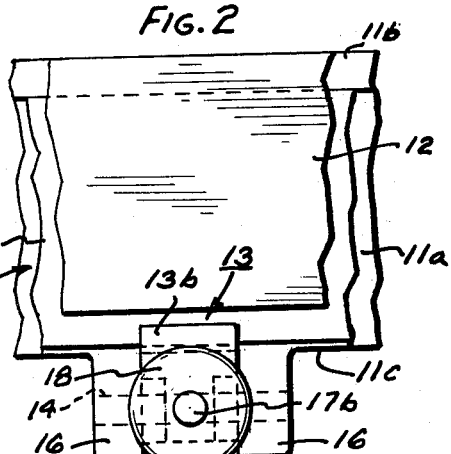
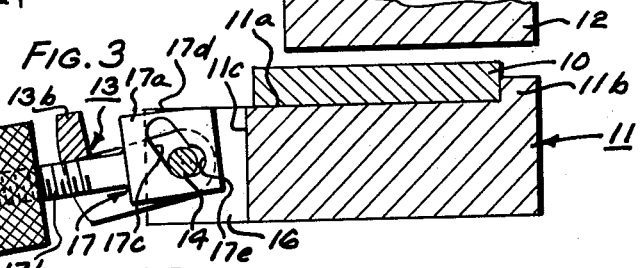
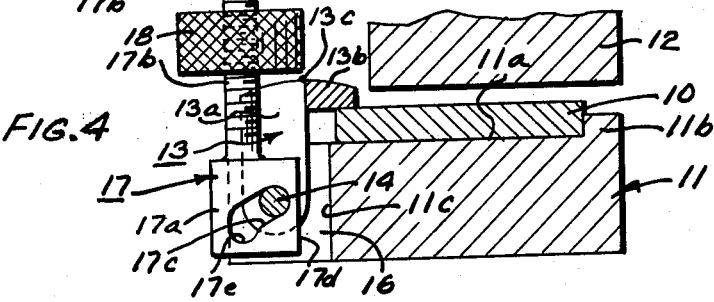
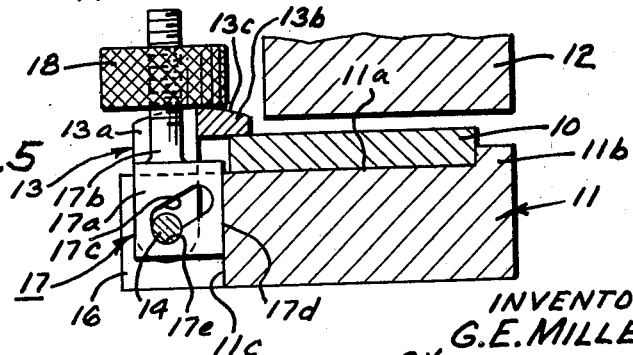
INVENTOR
G.E. MILLER
BY
ATTORNEY

United States Patent Office 3,147,005
Patented Sept. 1, 1964

3,147,005
CLAMPING ASSEMBLY
Glenn E. Miller, Omaha, Nebr., assignor to Western Electric Company, Incorporated, New York, N.Y., a corporation of New York
Filed July 20, 1962, Ser. No. 211,328
7 Claims. (Cl. 269—237)

This invention relates to clamping assemblies, and more particularly to clamping assemblies which positively lock into clamping position for clamping a part. It is an object of this invention to provide new and improved apparatus of this character.

It is standard practice in certain manufacturing operations to clamp a part in apparatus in a predetermined position for an assembling or other type processing operation using a clamping assembly. However, during the processing operation the clamping assembly may inadvertently become loosened, thus permitting the part to shift out of the predetermined position before the processing operation is completed. The part then may have to be relocated and reclamped in the predetermined position before the processing operation can be continued. In other instances, as for example where a drilling, grinding, tapping or similar processing operation is being performed on the part by processing equipment, the shifting of the part may result in spoiling of the part by the processing equipment, and/or damage to the processing equipment.

In many instances the part is placed manually in the predetermined position by an operator located at one side of the apparatus, and in these instances it is desirable that the clamping assembly be designed and located so as to be readily accessible to the operator, and yet not interfere with the placing of the part, or with subsequent removal of the part after the processing operation is completed. In other instances, the nature of the processing equipment is such that access to the predetermined position is limited, so that the clamping assembly must be mounted adjacent one side of the apparatus and the part must be placed in the predetermined position from the same side of the apparatus.

Accordingly, another object of this invention is to provide a new and improved clamping assembly for firmly clamping a part in position for a processing operation.

A further object of this invention is to provide a new and improved clamping assembly which includes elements movable into positions above the level of a part supporting surface for clamping a part against the surface, and movable to inoperative positions below the level of the part supporting surface so that the clamping assembly does not interfere with placing of the part in position against the surface and with removal of the part from the surface.

A still further object of this invention is to provide a new and improved clamping assembly which, as it moves into part-clamping position, first moves into a position in which it is locked against inadvertent movement away from the part-clamping position, and then moves into the part-clamping position to clamp the part.

In accordance with the invention, a clamping member is pivoted on a base member for clamping a part between the clamping member and the base member, and a locking member is mounted on the base member for pivotal and linear movement. In clamping the part, mechanisms on the base member, clamping member and locking member cooperate to move the locking member linearly relative to the base member to bring surfaces on the locking member and the base member into engagement, to prevent the locking member and the clamping member from moving out of clamping position, and also cooperate to move the clamping member into clamping position to clamp the part.

In a preferred embodiment of the invention, a clamping member is pivotally supported on a base member on a pin which is receivable through an elongated slot in a locking member. The locking member includes a screw threaded shank having its longitudinal axis inclined with respect to the longitudinal axis of the slot, and a screw threaded nut member is mounted on the screw threaded shank. The clamping member and the locking member can be pivoted through arcs in excess of 90 degrees to permit positioning of the threaded nut member and a portion of the clamping member above the level of a part supporting surface of the base member for clamping the part against the surface, and to permit movement of the threaded nut member and the portion of the clamping member into inoperative positions below the level of the part supporting surface so that the clamping assembly will not interfere with positioning of the part on the part supporting surface, and with removal of the part from the part supporting surface.

In clamping the part, the screw threaded nut member is engaged with the clamping member and is turned on the screw threaded shank to move the locking member laterally with respect to the longitudinal axis of the mounting pin. This movement of the locking member is confined by the slot therein so that the locking member moves linearly toward the base member to bring surfaces on the locking member and the base member into engagement, to fix the locking member against pivotal movement and to prevent pivoting of the clamping member away from its clamping position. After the surfaces have engaged, turning of the threaded nut member on the screw threaded shank of the locking member moves the locking member so that the mounting pin seats in an offset seat portion of the slot, which cooperates with the engaged surfaces to fix the locking member in position. Subsequently, further turning of the threaded nut member on the screw threaded shank causes the clamping member to pivot toward the part supporting surface to clamp the part, where it is held locked in clamping position by the locking member and the threaded nut member on the locking member.

This invention, together with further objects and advantages thereof, will best be understood by reference to the following detailed description, taken in connection with the accompanying drawing, in which:

FIG. 1 is a front view of the clamping assembly in a first operating position;

FIG. 2 is a plan view of the clamping assembly in the first operating position;

FIG. 3 is a cross-sectional view taken substantially along the line 3—3 of FIG. 1, and showing the clamping assembly in a second operating position;

FIG. 4 is a cross-sectional view similar to FIG. 3 but showing the clamping assembly in a third operating position; and FIG. 5 is a cross-sectional view similar to FIG. 3 but showing the apparatus in the first operating position of FIGS. 1 and 2.

Referring to the drawing, it is seen that the illustrated embodiment of the invention is designed to clamp a part 10, shown in the form of a flat plate, in position on a base member 11 on a part-supporting surface 11a of the base member. The base member 11 includes an upstanding stop flange 11b which extends along the right-hand side thereof, as viewed in FIGS. 3, 4 and 5, and against which the part 10 can be positioned.

In the illustrated embodiment of the invention, the base member 11 is suitably mounted in a fixed position vertically beneath processing apparatus 12 associated therewith, and of which it may form an integral part, and is shown as being located closely adjacent the processing apparatus so that access to the part-supporting surface 11a of the base member is limited and the part 10 must be positioned thereon from the left, and removed therefrom from the left, as viewed in FIGS. 3, 4 and 5. The processing apparatus 12 may be of any suitable type, as for example apparatus for assembling parts to the part 10, or apparatus for performing a drilling, grinding, tapping or other type operation on the part 10.

The clamping assembly includes a hook-shaped clamping member 13 having a pair of laterally spaced legs 13a integrally connected at their upper ends, as viewed in FIGS. 4 and 5, by a projecting part engaging portion 13b. The legs 13a of the clamping member 13 are mounted on a cylindrical pin 14 so that the clamping member can be pivoted into a clamping position as shown in FIGS. 1, 2 and 5, in which the part engaging portion 13b extends above the level of the part-supporting surface 11a for clamping the part 10 on the surface, and so that the clamping member can be pivoted counterclockwise, as viewed in FIG. 5, out of clamping position into the position shown in FIG. 3, in which it will not interfere either with positioning of the part 10 on the base member 11, or with removal of the part from the base member, from the left as viewed in FIG. 3. The clamping member 13 further includes an arcuate surface 13c formed on the upper ends (FIGS. 4 and 5) of the legs 13a and the part engaging portion 13b, for a purpose subsequently to be described.

The mounting pin 14 has its opposite ends force fitted into apertures in a pair of laterally spaced lugs 16 integrally secured to a vertical surface 11c of the base member 11. The clamping member 13, as is best shown in FIGS. 1 and 2, is mounted for pivotal movement on the pin 14 between the lugs 16.

A locking member 17, including a block-shaped portion 17a and a screw threaded shank 17b, is mounted on the pin 14 between the legs 13a of the clamping member 13. For this purpose, as is best shown in FIGS. 3, 4 and 5, the block-shaped portion 17a of the locking member 17 has an elongated slot 17c formed therethrough for receiving the pin 14. A nut member 18 is threaded on the shank 17b.

The locking member 17 is movable on the pin 14 into the position shown in FIG. 3, in which the threaded nut member 18 is below the level of the part-supporting surface 11a, so that, as in the case of the clamping member 13, the locking member and the screw threaded nut member 18 thereon can be positioned so as not to interfere either with placing of the part 10 on the base member 11, or with removal of the part from the base member, from the left as viewed in FIG. 3. Further, the locking member 17 is movable on the pin 14 from the position shown in FIG. 3 into the position shown in FIG. 4, in which the threaded nut member 18 is above the level of the part-supporting surface 11a and closely adjacent the arcuate surface 13c of the clamping member 13. The locking member 17 also is movable on the pin 14 from the position shown in FIG. 4 into the position shown in FIG. 5, for clamping the part 10 on the part-supporting surface 11a.

The arcuate surface 13c of the clamping member 13 has a configuration such that when the clamping member, the locking member 17 and the threaded nut member 18 are in the positions shown in FIG. 4, the threaded nut member can be turned downward on the screw threaded shank 17b to engage the arcuate surface 13c to the right (FIG. 4) of the longitudinal axis of the pin 14, and thus of the pivotal axis of the clamping member, to pivot the clamping member clockwise (FIG. 4) against the part 10 on the base member 11. Subsequently, as the threaded nut member 18 is turned further downward on the shank 17b the locking member 17 is moved upward against gravity, and linearly toward the right, as viewed in FIG. 4, as a result of the sides of the slot 17c in the locking member riding on the pin 14, until a flat surface 17d of the locking member engages the vertical surface 11c of the base member 11, as viewed in FIG. 5.

After the surfaces 11c and 17d of the base member 11 and the locking member 17 have come into engagement as a result of the turning of the threaded nut member 18 downward on the screw threaded shank 17b, further turning of the nut member downward on the shank causes the locking member to be drawn linearly upward so that the pin 14 engages in an offset arcuate seat portion 17e at one end of the slot 17c in the locking member. In this regard, the radial center of the arcuate seat 17e is located on the longitudinal axis of the screw threaded shank 17b, and is located from the flat surface 17d on the locking member 17 the same distance that the longitudinal axis of the mounting pin 14 is located from the vertical surface 11c on the base member 11. Thus, as is best shown in FIG. 5, when the surfaces 11c and 17d have engaged and the locking member 17 is drawn upward, as above described, the pin 14 will become centered and firmly seated in the arcuate seat 17e.

After the pin 14 has seated in the arcuate seat 17e as a result of the turning of the threaded nut member 18 downward on the screw threaded shank 17b, continued turning of the threaded nut member 18 downward on the shank 17b cams the clamping member 13 further clockwise, as viewed in FIG. 5, on the pin 14 to clamp the part 10 firmly against the part-supporting surface 11a.

When the surfaces 11c and 17d of the base member 11 and the locking member 17 have come into engagement and the pin 14 has seated in the arcuate seat portion 17e, pivotal movement of the locking member 17 either clockwise or counterclockwise, as viewed in FIG. 5, is positively prevented by the engaged surfaces. Further, any tendency for the locking member 17 to move horizontally to the left (FIG. 5) away from the base member 11 is substantially prevented by the pin 14 in the arcuate seat 17e. Thus, the clamping member 13 is locked against movement counterclockwise (FIG. 5) away from its clamping position by the threaded nut member 18 on the locking member 17 in engagement with the arcuate surface 13c of the clamping member, but can be pivoted clockwise (FIG. 5) into its clamping position by downward turning movement of the nut member 18, as above described. Further, it is apparent from FIG. 5 that after the clamping member 13 has been moved into its clamping position by the threaded nut member 18, the engaged surfaces 11c and 17d, and the pin 14 and the arcuate seat 17e, continue to cooperate to prevent movement of the locking member 17 so that the threaded nut member positively prevents movement of the clamping member out of clamping position.

In clamping the part 10 on the base member 11, the clamping member 13 and the locking member 17 are moved into the positions shown in FIG. 3, and the part 10 is placed on the part-supporting surface 11a of the base member 11 with the right-hand edge (FIG. 3) of the part in engagement with the upstanding stop flange 11b. The clamping member 13 and the locking member 17 then are moved on the mounting pin 14 into the positions shown in FIG. 4, and the screw threaded nut member 18 is turned downward on the screw threaded shank 17b to engage the arcuate surface 13c of the clamping member. As the threaded nut member 18 is turned further downward on the shank 17b, the pin 14 cooperates with the slot 17c in the locking member 17 so that the locking member moves upward toward the right until the surfaces 11c and 17d of the base member 11 and the locking member have engaged, after which the locking member moves upward until the pin 14 seats in the arcuate seat 17e. Subsequently, further turning of the screw threaded nut member 18 downward on the shank 17b causes the clamping member 13 to pivot clockwise (FIG. 5) to clamp the part firmly in position on the base member 11.

To remove the part 10 from the base member 11, the screw threaded nut member 18 is turned upward (FIG. 5) on the screw threaded shank 17b. This turning movement of the threaded nut member 18 releases the clamping member 13 and also permits the locking member 17 to drop by gravity downward to the left to the position shown in FIG. 4, after which the clamping member 13 and the locking member 17 can be moved back to the positions shown in FIG. 3. The part 10 then can be removed from the base member 11 and a new part 10 can be positioned thereon.

While in the illustrated embodiment of the invention the base member 11 is disclosed as being fixed in position, and the clamping assembly is shown as being designed to clamp the part 10 for a processing operation, it is apparent that the assembly of the base member 11, clamping member 13, pin 14, locking member 17 and threaded nut member 18 could be used as a portable clamping assembly, and also could be used to clamp a part or parts for other purposes. Further, while the elongated slot 17c in the locking member 17 is shown as having the offset arcuate seat portion 17e for receiving the pin 14, to help prevent movement of the locking member during a clamping operation, it is apparent that the seat 17e could be eliminated if so desired.

From the foregoing description, it is apparent that the engageable surfaces 11c and 17d of the base member 11 and the locking member 17, the threaded nut member 18 on the locking member, the arcuate surface 13c on the clamping member 13, and the arcuate seat 17e for receiving the pin 14, cooperate to provide a clamping assembly which positively locks into clamping position for clamping the part 10 firmly on the base member 11. It also is apparent that the clamping member 13 and the locking member 17, including the screw threaded nut member 18 on the locking member, are readily accessible to an operator for the processing apparatus 12, and yet can be moved out of their clamping positions into positions in which they will not interfere with positioning of the part 10 on the base member 11 and removal of the part therefrom. Further, the construction wherein the screw threaded nut member 18 is operated first to move the surfaces 11c and 17d into locking engagement, and subsequently to pivot the clamping member 13 into clamping position, provides an apparatus in which the clamping of the part 10 can be performed in a rapid and efficient manner.

While one embodiment of the invention has been disclosed, many modifications will be apparent and it is intended that the invention be interpreted as including all modifications which fall within the true spirit and scope of the invention.

What is claimed is:

1. A clamping assembly, which comprises:
a base member;
a clamping member pivoted on said base member for clamping a part between said base member and said clamping member;
a locking member mounted on said base member for pivotal and linear movement;
limiting surfaces on said locking member and said base member engageable with one another for preventing said locking member and said clamping member from moving out of clamping position;
means for moving said locking member relative to said base member;
means for applying force to said clamping member to pivot said clamping member into clamping position to clamp the part; and
interengaging means on said base member and said locking member for causing said locking member to move linearly toward said limiting surface on said base member as said locking member is moved relative to said base member, to bring said limiting surfaces on said locking member and said base member into engagement, said engaged limiting surfaces preventing movement of said locking member and said clamping member out of clamping position as long as clamping pressure is applied to said clamping member by said force applying means.

2. A clamping assembly, which comprises:
a base member having a surface for supporting a part;
a clamping member pivoted on said base member;
a locking member mounted on said base member for pivotal and linear movement;
limiting surfaces on said locking member and said base member engageable with one another for preventing said locking member and said clamping member from moving out of clamping position;
a movable member on said locking member engageable with said clamping member for causing movement of said locking member relative to said base member;
means including said movable member for applying force to said clamping member to pivot said clamping member into clamping position to clamp the part against the part supporting surface; and
interengaging means on said base member and said locking member for causing said locking member to move linearly toward said limiting surface on said base member as said locking member is moved relative to said base member by said movable member, to bring said limiting surfaces on said locking member and said base member into engagement, said engaged limiting surfaces preventing said locking member and said clamping member from moving out of clamping position as long as clamping pressure is applied to said clamping member by said force applying means, and said locking member and said clamping member each being pivotable through an arc in excess of 90 degrees such that said movable member and a portion of said clamping member can be positioned above the level of the part supporting surface for clamping the part against the surface, and can be moved to positions below the level of the surface to permit positioning of the part on the surface and removal of the part from the surface.

3. A clamping assembly, which comprises:
a base member;
a clamping member pivoted on said base member for clamping a part between said base member and said clamping member;
a locking member mounted on said base member for pivotal and linear movement;
limiting surfaces on said locking member and said base member engageable with one another for preventing said locking member and said clamping member from moving out of clamping position;
a movable member on said locking member engageable with said clamping member and movable to cause movement of said locking member relative to said clamping member and subsequently to cause movement of said clamping member into clamping position to clamp the part;
interengaging means on said base member and said locking member for causing said locking member to move linearly toward said limiting surface on said base member as said locking member is moved relative to said clamping member by said movable member, to bring said limiting surfaces on said locking member and said base member into engagement; and
means for limiting the movement of said locking member relative to said clamping member by said movable member such that continued movement of said movable member pivots said clamping member into its part clamping position, said engaged limiting surfaces preventing said locking member and said clamping member from moving out of clamping position as long as clamping pressure is applied to said clamping member by said movable member.

4. A clamping assembly, which comprises:
a base member;
a clamping member pivoted on said base member for clamping a part between said base member and said clamping member;
a locking member mounted on said base member for pivotal and linear movement;
limiting surfaces on said locking member and said base member engageable with one another for preventing said locking member and said clamping member from moving out of clamping position;
a screw threaded shank on said locking member;
a threaded nut member on said screw threaded shank engageable with said clamping member and turnable on said shank to move said locking member relative to said clamping member and subsequently to move said clamping member into clamping position to clamp the part;
interengaging means on said base member and said locking member for causing said locking member to move linearly toward said limiting surface on said base member as said locking member is moved relative to said clamping member by the turning of said nut member on said shank, to bring said limiting surfaces on said locking member and said base member into engagement; and
means for limiting the movement of said locking member relative to said clamping member by the turning of said nut member on said shank such that continued turning of said nut member on said shank pivots said clamping member into its part clamping position, said engaged limiting surfaces on said locking member and said base member preventing said locking member and said clamping member from moving out of clamping position as long as clamping pressure is applied to said clamping member by said nut member.

5. A clamping assembly, which comprises:
a base member;
a mounting pin on said base member;
a clamping member mounted on said pin for pivotal movement toward said base member for clamping a part between said clamping member and said base member;
a locking member having an elongated slot therethrough, said mounting pin being receivable through the slot for mounting said locking member on said pin for pivotal and linear movement;
limiting surfaces on said locking member and said base member engageable with one another for preventing said locking member and said clamping member from moving out of clamping position;
means for producing a reactive force between said locking member and said clamping member to cause movement of said locking member relative to said clamping member and laterally with respect to the longitudinal axis of said pin;
side portions of the slot in said locking member engageable with said pin to cause the movement of said locking member by said reactive force producing means to be linearly toward said limiting surface on said base member to bring said limiting surfaces on said locking member and said base member into engagement; and
a wall portion of the slot in said locking member bearable against said pin after said limiting surfaces are engaged, to limit the movement of said locking member relative to said clamping member by said reactive force producing means such that continued application of force by said force producing means pivots said clamping member into its part clamping position, after which said engaged limiting surfaces prevent movement of said locking member and said clamping member out of clamping position as long as clamping pressure is applied to said clamping member by said force producing means.

6. A clamping assembly, which comprises:
a base member;
a mounting pin on said base member;
a clamping member mounted on said pin for pivotal movement toward said base member for clamping a part between said clamping member and said base member;
a locking member having an elongated slot formed therethrough, said mounting pin being receivable through the slot for mounting said locking member on said pin for pivotal and linear movement;
limiting surfaces on said locking member and said base member engageable with one another for preventing said locking member and said clamping member from moving out of clamping position;
a screw threaded shank on said locking member having its longitudinal axis inclined with respect to the longitudinal axis of the slot in said locking member;
a screw threaded nut member on said screw threaded shank engageable with said clamping member and turnable on said shank to move said locking member relative to said clamping member;
side portions of the slot in said locking member engageable with said pin to cause the movement of said locking member relative to said clamping member to be linearly toward said lining surface on said base member to bring said limiting surfaces on said locking member and said base member into engagement; and
a wall portion of the slot in said locking member bearable against said pin after said limiting surfaces are engaged, to limit the movement of said locking member relative to said clamping member such that continued turning of said nut member on said shank pivots said clamping member into clamping position to clamp the part, after which said engaged limiting surfaces prevent movement of said locking member and said clamping member out of clamping position as long as clamping pressure is applied to said clamping member by said nut member.

7. A clamping assembly, which comprises:
a base member having a surface for supporting a part;
a limiting surface on said base member;
a mounting pin on said base member having its longitudinal axis located a predetermined distance from said limiting surface;
a hook-shaped clamping member mounted on said pin for pivotal movement;
a locking member having an elongated slot formed therethrough, said mounting pin being receivable through the slot for mounting said locking member on said pin for pivotal movement, and for linear movement toward and away from said limiting surface on said base member;
a limiting surface on said locking member engageable with said limiting surface on said base member for preventing said locking member and said clamping member from pivoting out of clamping position, the slot in said locking member including an offset seat portion adajcent one end designed to receive said pin in close fitting relationship and having its center located from said limiting surface on said locking member substantially the predetermined distance that the longitudinal axis of said pin is located from said limiting surface on said base member;
a screw threaded shank on said locking member having its longitudinal axis inclined with respect to the longitudinal axis of the slot in said locking member, with the axis of said shank substantially extending through the center of the offset seat portion of the slot;

a screw threaded nut member on said screw threaded shank engageable with said clamping member and turnable on said shank to move said locking member laterally with respect to the longitudinal axis of said pin until said pin is positioned in the seat portion of the slot; and side portions of the slot in said locking member engageable with said pin to cause the movement of said locking member by said nut member to be linearly toward said limiting surface on said base member to bring said limiting surfaces on said locking member and said base member into engagement, said nut member being engageable with said clamping member at a point such that after said limiting surfaces are in engagement and said pin is positioned in the seat portion of the slot the line of force exerted on said clamping member by further turning of said nut member on said shank passes in spaced relationship to said clamping member's pivotal axis on a side thereof adjacent the part and causes said clamping member to pivot toward said base member to clamp the part against the part supporting surface, said engaged limiting surfaces preventing said locking member and said clamping member from moving out of clamping position as long as clamping pressure is applied to sail clamping member by said nut member, and said locking member and said clamping member each being pivotable through an arc in excess of 90 degrees such that said threaded nut member and a portion of said clamping member can be positioned above the level of the part supporting surface on said base member for clamping the part against the surface, and can be pivoted to positions below the level of the surface to permit positioning of the part on the surface and removal of the part from the surface.

References Cited in the file of this patent

UNITED STATES PATENTS 687,177     Caldwell _____ Nov. 19, 1901

FOREIGN PATENTS 747,480     France _____ Mar. 28, 1933

UNITED STATES PATENT OFFICE
CERTIFICATE OF CORRECTION

Patent No. 3,147,005                   September 1, 1964

Glenn E. Miller

It is hereby certified that error appears in the above numbered patent requiring correction and that the said Letters Patent should read as corrected below.

Column 4, line 5, for "viewed" read -- shown --; column 8, line 30, for "lining" read -- limiting --; column 10, line 6, for "sail" read -- said --.

Signed and sealed this 19th day of January 1965.

(SEAL)
Attest:

ERNEST W. SWIDER
Attesting Officer

EDWARD J. BRENNER
Commissioner of Patents